United States Patent Office 2,770,294
Patented Nov. 13, 1956

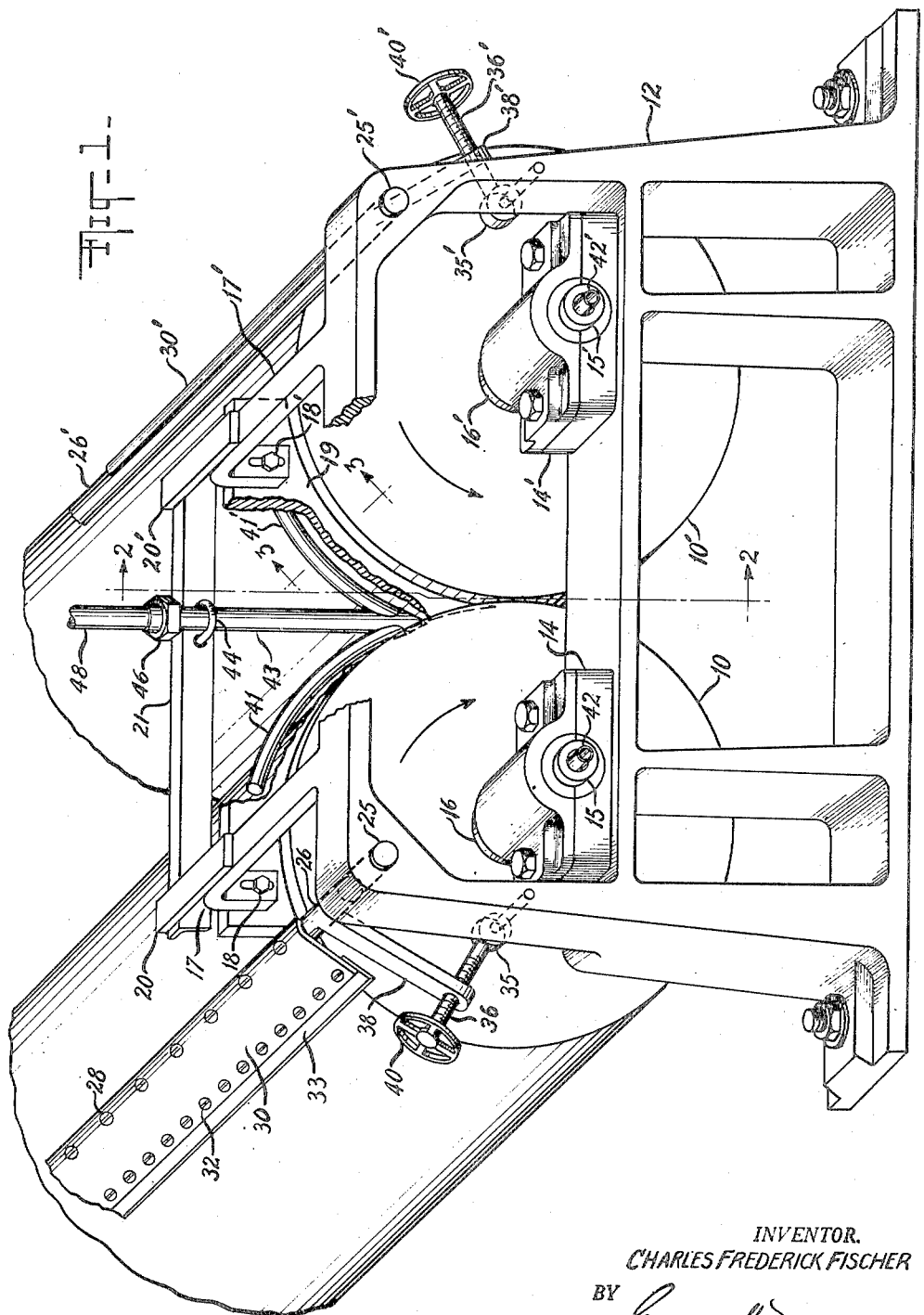

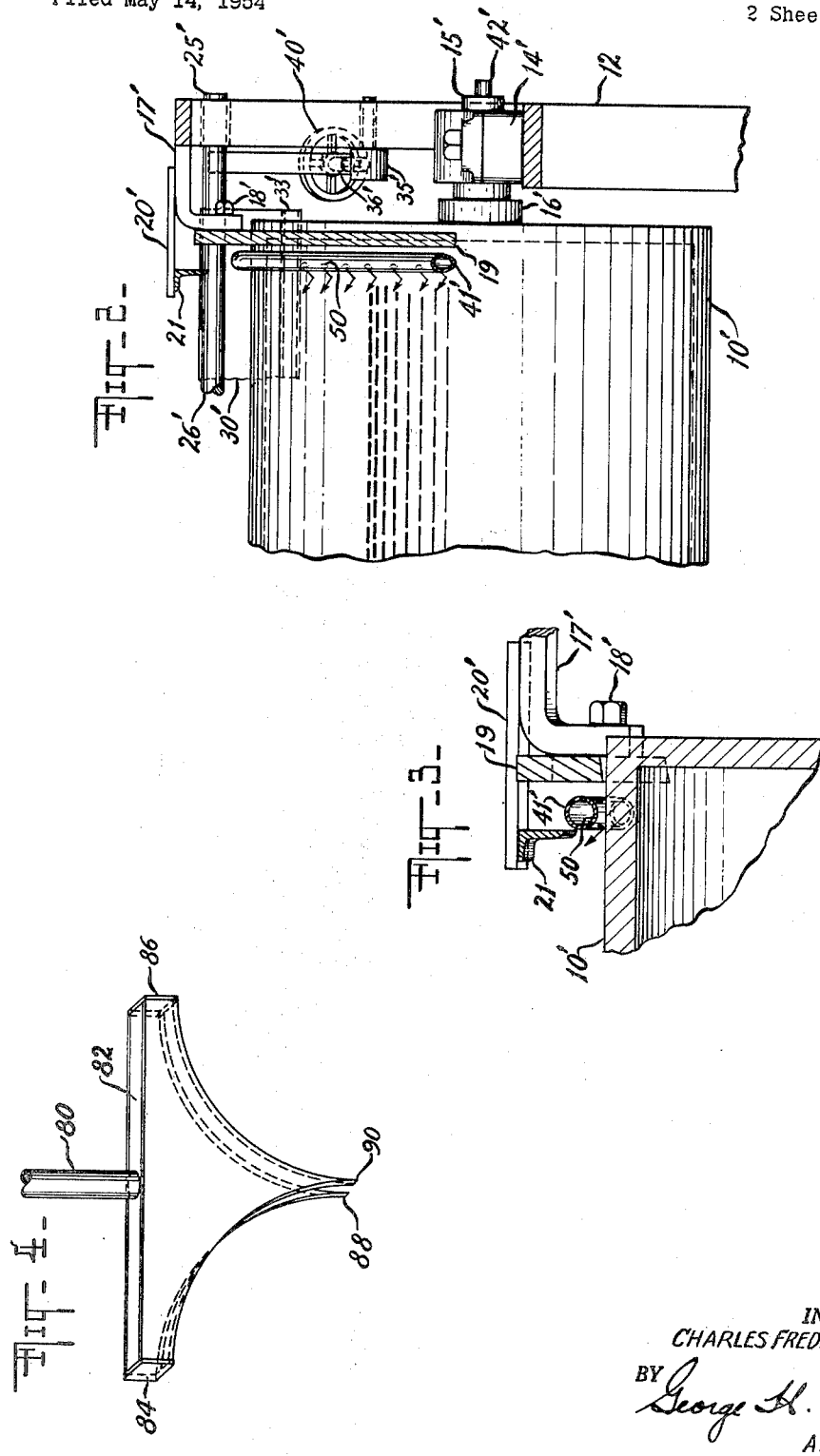

2,770,294

APPARATUS FOR PROCESSING LIQUID MATERIAL

Charles Frederick Fischer, Jersey City, N. J., assignor to Colgate-Palmolive Company, Jersey City, N. J., a corporation of Delaware Application May 14, 1954, Serial No. 429,931

6 Claims. (Cl. 159—10)

This invention relates to apparatus for processing liquid material, and more particularly to such apparatus having a trough shaped space defined in part by he upper cylindrical surface of a rotary drum and having pneumatic means disposed at an end of said trough for confining liquid therein.

It has previously been proposed to retain the liquid to be processed by rotary drum apparatus in a trough formed in part by the upper surface of a drum. Such a trough may be further defined by the upper surface of a second rotary drum, as in certain double-drum apparatus, or by other appropriate means. However, in all such devices it is necessary to provide means to define the ends of such a trough in order to maintain a supply of liquid therein. For this purpose it has been proposed to use an endboard comprising mechanical means held against the surface of the drum with considerable pressure so as to effect a liquid-tight seal between the rotating drum and the stationary endboard.

There are several disadvantages inherent in such mechanical devices. For example, in order to assure a tight fit an endboard may have to be "worn in," and in the event the separation between the drums of a multiple unit is varied, the endboard may have to be refitted. Since mechanical endboards are normally held in contact with the drum surface under considerable pressure, the endboard and the drum are both subjected to extensive wear and friction. The use of excessive power in overcoming such friction causes unnecessary wear on the drum bearings and drive. Another extremely undesirable feature of such mechanical devices is their propensity to cause degradation of the product being handled. This frequently occurs as the result of liquid creeping between the drum and an endboard and there being exposed to excessive heat which causes decomposition and production of discolored and gummy and/or charred material. Such charred material is usually hard and gritty and tends to wear the endboard rapidly at the point of contact, thus aggravating the condition. Ultimately some such decomposed material is forced onto the drum surface and there contaminates the bulk of the product.

The present invention provides means for overcoming many of the disadvantages inherent in the use of mechanical endboards. For example, mechanical wear of the apparatus caused by friction between the drum surface and the endboard is eliminated as is the necessity for "wearing-in" endboards. Another extremely beneficial advantage is the elimination of product contamination as experienced when using mechanical endboards.

In accordance with the present invention apparatus for processing liquid material comprises a trough having at least one wall formed by a rotatable drum, and means at an end of said trough for directing a gas stream into the trough for confining the liquid therein. In a preferred embodiment of the present invention, the efficiency of the gas-stream directing means is improved by the use of a gas deflecting means disposed to retard the escape of gas from the end of the trough. Thus it is possible, by means of the apparatus of the present invention, to process a liquid on rotating drum apparatus completely free of mechanical endboards and the disadvantages inherent therein.

In the accompanying drawings:

Fig. 1 is a fragmentary oblique isometric view of an atmospheric double drum drier having a liquid supply trough formed by the upper surfaces of two rotary drums and equipped with one form of pneumatic endboard embodying the present invention;

Fig. 2 is a sectional elevation of a portion of the apparatus shown in Fig. 1 along the curved line 2—2 of Fig. 1 viewed in the direction of the arrows;

Fig. 3 is a fragmentary sectional view of a portion of the apparatus shown in Fig. 1 being taken in the direction of the arrows along the line 3—3 of Fig. 1, which line is radial with respect to the longitudinal axis of one of the drums and located about midway between the top of said drum and the point nearest to contact with the second drum; and Fig. 4 is a perspective view of a modified form of pneumatic manifold suitable for use in accordance with the present invention.

Referring now to Fig. 1 of the accompanying drawings, the illustrative drum drier comprises two cylindrical drums 10, 10' which have their axes arranged horizontally and parallel and their opposing surfaces close together so as to form a trough. The main frame 12 of the drier is provided with suitable plummer blocks 14, 14' for receiving the horizontal trunnions 15, 15' which project from shoulders 16, 16' extending from the center of each end of each drum. The main frame 12 also carries inwardly projecting arms 17, 17' to which bolts 18, 18' hold a gas-deflecting plate 19. Welded to the upper surface of these arms 17, 17' is a framework comprising two projecting arms 20, 20' and a crosspiece 21. Mounted in the main frame 12 are bearings 25, 25' for receiving a swiveling doctor knife supporting bar 26, 26' associated with each drum. Removably affixed to the doctor knife supporting bar 26 by screws 28 is a retainer 30 to which bolts 32 hold a doctor knife 33. In a similar fashion, a second doctor knife 33' (visible only in Fig. 2) is supported by a retainer 30'. Also mounted on the main frame in swiveling mounts 35, 35' is a pair, one for each drum, of rotatable threaded shafts 36, 36' which pass through threaded openings in extension arms 38, 38' and terminate in handwheels 40, 40'. Each extension arm 38, 38' is affixed to a swiveling doctor knife supporting bar 26, 26'. Thus positioning of the doctor blades 33, 33' is effected by rotation of the handwheels 40, 40'. Conduits 42, 42' for carrying steam or other heating medium into the drums pass axially through the center of each trunnion 15, 15', condensate being siphoned out of the drums through conduits in the trunnions at the ends of the drums which are not illustrated.

The air manifold comprises two curved sections 41, 41' of hollow tubing each having a radius of curvature approximately equal to that of the periphery of the drums and a length approximately one-fifth the circumference of the drums, said curved sections each being closed at their outer end and welded at their inner end to the terminal portion of a central air supply conduit 43. Thus in effect the two arms 41, 41' and the central conduit 43 form a bisected V shaped manifold unit adapted to fit in the trough formed by the upper surfaces of the drier drums. The air manifold is supported by a clamp 44 holding the central air supply conduit 43 to the previously referred to crosspiece 21. The uppermost end of the central air supply conduit 43 is terminated in a union 46 to facilitate connection to an air supply line 48.

Each curved section of the air manifold 41, 41' is perforated by a plurality of orifices (not visible in Fig. 1)

disposed so as to direct streams of air downwardly against the adjacent drum surface and inwardly against the fluid being processed. To disposition of the orifices and functioning of the streams of air, which in essence form a blanket or wall of air, is best understood by reference to Fig. 2 and Fig. 3 in which several representative orifices 50 are illustrated and the direction of the flow of air is represented by arrows.

Referring now to Fig. 2, the trough between the drums is filled to about one-third its height with liquid to be processed. This liquid is retained within the trough at its end by the force of the air streams issuing from the orifices 50 in the curved section of the air manifold 41'. These orifices 50 are so disposed as to direct the air streams simultaneously inwardly against the apex and adjacent side walls of the trough and the main body of liquid. An optional gas-deflecting endboard 19, illustrated as a preferred embodiment of the present invention in Figs. 1, 2 and 3, is disposed adjacent to the outer side of the air manifold. This gas-deflector helps to direct the flow of air in the region about the air manifold and also acts as a partial mechanical endboard in the event the air supply should fail. As shown on an enlarged scale in Fig. 3, neither the manifold nor the gas-deflector are in physical contact with the drum surface.

In operation, the drums are rotated toward each other at the top by driving means (not shown) connected to the trunnions 15, 15'. Heating steam is admitted to the interior of the drums through conduits 42, 42' passing through the trunnions and compressed air is supplied to the central air supply conduit 43 at the union 46. The material to be dried, such as kettle soap, is fed into the feed chamber or trough between the two drums and the rate of flow of air supplied to the central air supply conduit is adjusted (by means not shown) so as to be slightly in excess of the minimum rate necessary to prevent the feed liquor from flowing off the ends of the feed trough. Obviously the air rate used will vary widely depending upon the height to which the feed trough is filled, and the nature and conditions of the feed liquor.

During the rotation of the drums, some of the feed liquor passes through the space between the drums and adheres as a coating or film on the peripheral surfaces thereof. Such material, which is dired as the drums rotate, is removed by doctor knives 33, 33' which are positioned by manually adjusting the knife positioning handwheels 40, 40' so as to remove a maximum amount of dried material from the drum surface without mechanical damage to the drum or to the knife.

Fig. 4 illustrates a manifold in accordance with another embodiment of this invention. In Fig. 4 the manifold unit comprises a central air supply conduit 80 terminating in a spacer plate 82 which, in conjunction with spacer plates 84, 86 at each end of the unit, support two closely spaced stiff metal sheets 88, 90. The edges of those sheets define a narrow slot having substantially the same profile as the trough between the drums of the drier on which the manifold is to be used. In use, the manifold is supported within the trough with the slotted opening in close proximity to the surfaces of the drums and air, delivered under pressure to the central air supply conduit 80, issues from the slot formed by the sheets 88, 90 comprising the sides of the manifold, strikes against the drum surfaces, and is deflected outwardly and upwards on both sides of the manifold. The force of the air escaping on the side of the manifold facing the main length of the trough serves to retain the liquid therein. If desired, this embodiment may also be used in conjunction with a gas-deflecting means 19 as previously described.

It is obvious that mechanical endboards of the prior art may be used with the apparatus of the present novel invention, if desired. In such a case, if both types of liquid retaining means are used at the same end of a trough, the pneumatic endboard is placed between the main fluid body and the mechanical endboard. Further, although described as endboards, the devices of the present novel invention may also be utilized as spacers or dividers in the central portion of a trough to permit simulataneous processing of a plurality of liquids on a single apparatus.

The term pneumatic as used in the present specification and claims is used with reference to the gaseous phase and is not limited to air. Thus use of steam, carbon dioxide, nitrogen, air or other such gas or mixtures of such gases is contemplated with the present novel apparatus. Further, the term liquid as used herein and in the appended claims refers to non-gaseous fluids generally, and thus embraces liquids, slurries, pastes, flowable gels, flowable solids, etc.

From the foregoing it will be seen that the present invention provides a simple pneumatic endboard which is adaptable for use under many conditions of drum spacing and feed liquor, which is simple to replace, and time saving to use. It will further be seen that many of the disadvantages of mechanical endboards, such as frictional losses, mechanical wear, and product contamination are overcome.

While there has been shown what is at present considered to be the preferred embodiment of the invention it will be understood, of course, that many modifications and changes may be made therein without departing from the true spirit of the invention which is to be accorded the full range of equivalents comprehended by the accompanying claims.

Having thus described the invention, what is desired to be secured by Letters Patent is:

1. Apparatus for processing liquids comprising a pair of parallel, adjacent, horizontally disposed rotary drums adapted to receive in the trough between said drums liquids to be processed on the circumferential surfaces thereof, a pneumatic manifold adjacent to each end of said trough adapted to deliver a stream of gas inwardly against liquid in said trough and against the apex and adjacent walls of said trough, and a gas deflecting means disposed to retard the escape of gas from the end of said trough.

2. Apparatus as set forth in claim 1 wherein said gas deflecting means comprises a gas-deflecting endboard.

3. Apparatus as set forth in claim 2 wherein said pneumatic endboard and said gas-deflecting endboard are free of physical contact with moving surfaces.

4. A pneumatic endboard for use with rotary drum apparatus adapted for processing liquids retained in a trough defined in part by the upper circumferential surface of said drum, said endboard comprising a gas delivery manifold having a perforate gas delivery portion of substantially the same contour as said trough, said perforate gas delivery section being adapted to deliver gas from said manifold simultaneously against the walls and the contents of said trough when said manifold is inserted therein in close proximity to but not in contact with said rotary drum.

5. Apparatus for processing liquid material comprising a horizontally disposed rotary drum, means adjacent thereto and forming therewith an open-ended, walled, feed chamber for liquid material to be processed, and means adjacent to each end of said feed chamber for directing a flow of gas against the walls of and into said feed chamber for preventing the liquid material from flowing outwardly therepast.

6. Apparatus for drying liquid material on the outer surface of a rotating heated drying drum comprising a rotatable cylindrical drum mounted with its central axis in a horizontal plane, means coacting with the outer cylindrical surface of said drum to form a horizontal open-ended walled liquid-retaining feed chamber, said chamber being adapted to hold a body of said liquid material in contact with the outer surface of said drum and to distribute a film of said liquid on said surface as the drum rotates, a pneumatic manifold adjacent to each end of said chamber adapted to direct a flow of gas against the walls thereof for preventing the liquid material from flowing therepast, and means for heating the outer surface of said rotating drum so as to dry the film of liquid material thereon.

References Cited in the file of this patent

UNITED STATES PATENTS

| | | |
|---|---|---|
| 1,530,439 | Testrup et al. | Mar. 17, 1925 |
| 1,748,618 | Petersen | Feb. 25, 1930 |
| 1,899,391 | Kass | Feb. 28, 1933 |
| 1,927,694 | Wood | Sept. 13, 1933 |
| 2,135,652 | Whitfield et al. | Nov. 8, 1938 |
| 2,155,083 | Drewsen | Apr. 18, 1939 |
| 2,220,316 | Creswell et al. | Nov. 5, 1940 |
| 2,457,083 | Jordan | Dec. 21, 1948 |
| 2,484,580 | Overton | Oct. 11, 1949 |